(12) United States Patent
Naidas

(10) Patent No.: US 8,111,335 B1
(45) Date of Patent: Feb. 7, 2012

(54) TELEVISION LISTING REMOTE CONTROL

(76) Inventor: Gary Naidas, Niles, IL (US)

( * ) Notice: Subject to any disclaimer, the term of this patent is extended or adjusted under 35 U.S.C. 154(b) by 1207 days.

(21) Appl. No.: 11/840,944

(22) Filed: Aug. 18, 2007

(51) Int. Cl.
*H04N 5/44* (2006.01)
(52) U.S. Cl. ...................................... 348/734
(58) Field of Classification Search .................. 348/734, 348/725; 340/12.22–12.55; 398/106–114; 341/176; 345/156–184; *H04N 5/44*
See application file for complete search history.

(56) References Cited

U.S. PATENT DOCUMENTS

| | | | | |
|---|---|---|---|---|
| 6,104,334 | A | * | 8/2000 | Allport ....................... 340/12.28 |
| 2002/0149704 | A1 | * | 10/2002 | Kano et al. ..................... 348/734 |
| 2003/0034898 | A1 | * | 2/2003 | Shamoon et al. ......... 340/825.72 |
| 2006/0217150 | A1 | * | 9/2006 | Chen ......................... 340/825.69 |

* cited by examiner

*Primary Examiner* — Sherrie Hsia

(57) ABSTRACT

A television listing remote control. An illustrative embodiment of the television listing remote control includes a central processing unit and a port, a power source and a display connected to the central processing unit. The central processing unit is adapted to receive television program listing information through the port and display the television program listing information on the display. A transmitter is connected to the central processing unit. A plurality of control buttons is connected to the central processing unit.

5 Claims, 3 Drawing Sheets

TELEVISION LISTING REMOTE CONTROL

FIELD

The present disclosure relates to remote control units for televisions. More particularly, the present invention relates to a television listing remote control which displays television programming.

BACKGROUND

Cable and satellite television subscriptions currently includes features which indicate current and future television program listings on the various channels offered by the subscriptions. The television program listings of these subscriptions are often attended by several drawbacks. In some systems, the television program listing is shown on a channel which is designated for that purpose. Therefore, a user must flip to that channel in order to determine which programs are currently being or will be offered on the channels of the subscription. In some systems, the television program listing is shown in small letters, making it difficult for a user to read the listing without squinting. Some subscriptions require an additional monthly fee for the television program listing service.

SUMMARY

The present invention is generally directed to a television listing remote control. An illustrative embodiment of the television listing remote control includes a central processing unit and a port, a power source and a display connected to the central processing unit. The central processing unit is adapted to receive television program listing information through the port and display the television program listing information on the display. A transmitter is connected to the central processing unit. A plurality of control buttons is connected to the central processing unit.

BRIEF DESCRIPTION OF THE DRAWINGS

The disclosure will now be made, by way of example, with reference to the accompanying drawings, in which.

DETAILED DESCRIPTION

Figure 1:
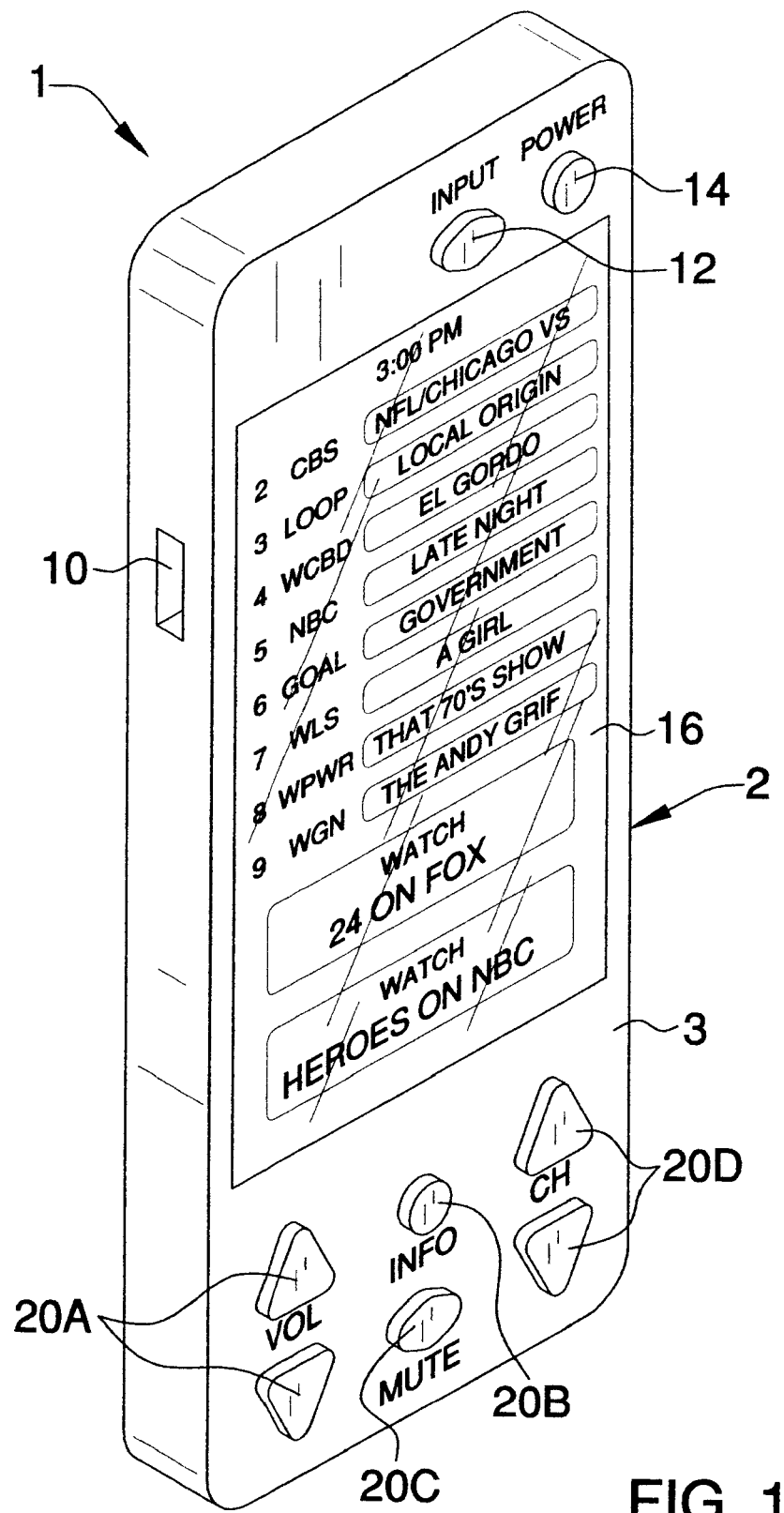
FIG. 1 is a front perspective view of an illustrative embodiment of the television listing remote control.
Figure 2:
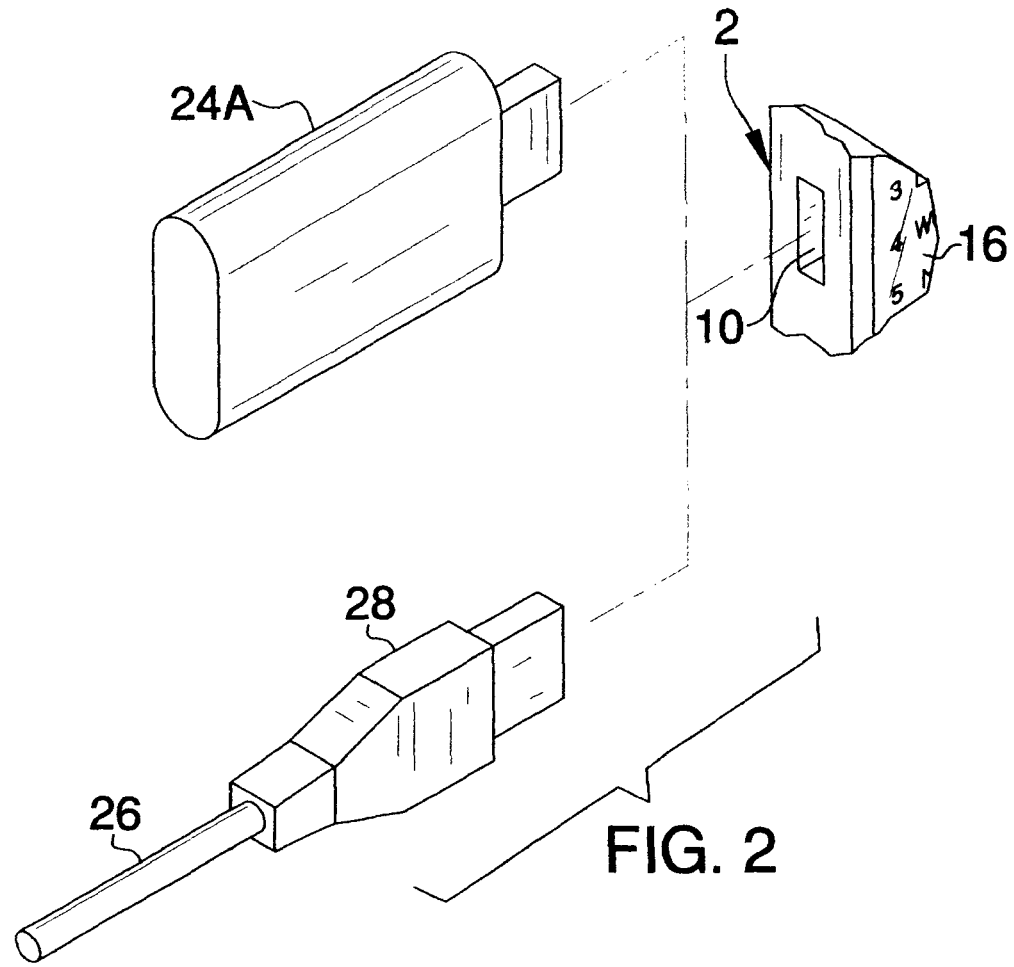
FIG. 2 are perspective views illustrating insertion of a selected one of a USB adaptor and a USB cord into a port provided in the television listing remote control.
Figure 3:
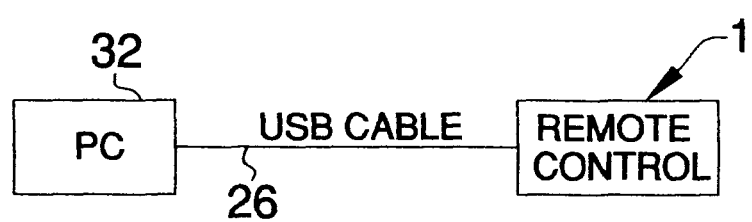
FIG. 3 is a block diagram which illustrates a personal computer connected to the television listing remote control via a USB cable.
Figure 4:
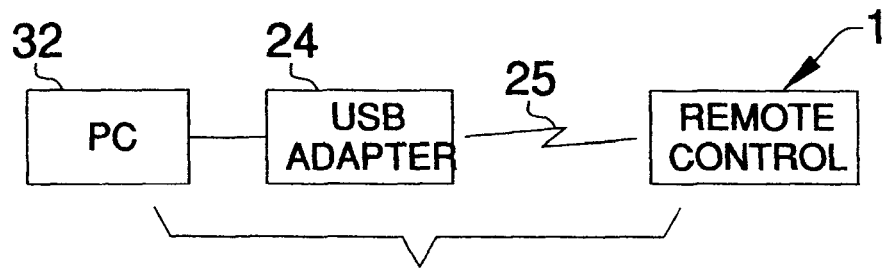
FIG. 4 is a block diagram which illustrates a personal computer connected to the television listing remote control via a USB adaptor.
Figure 5:
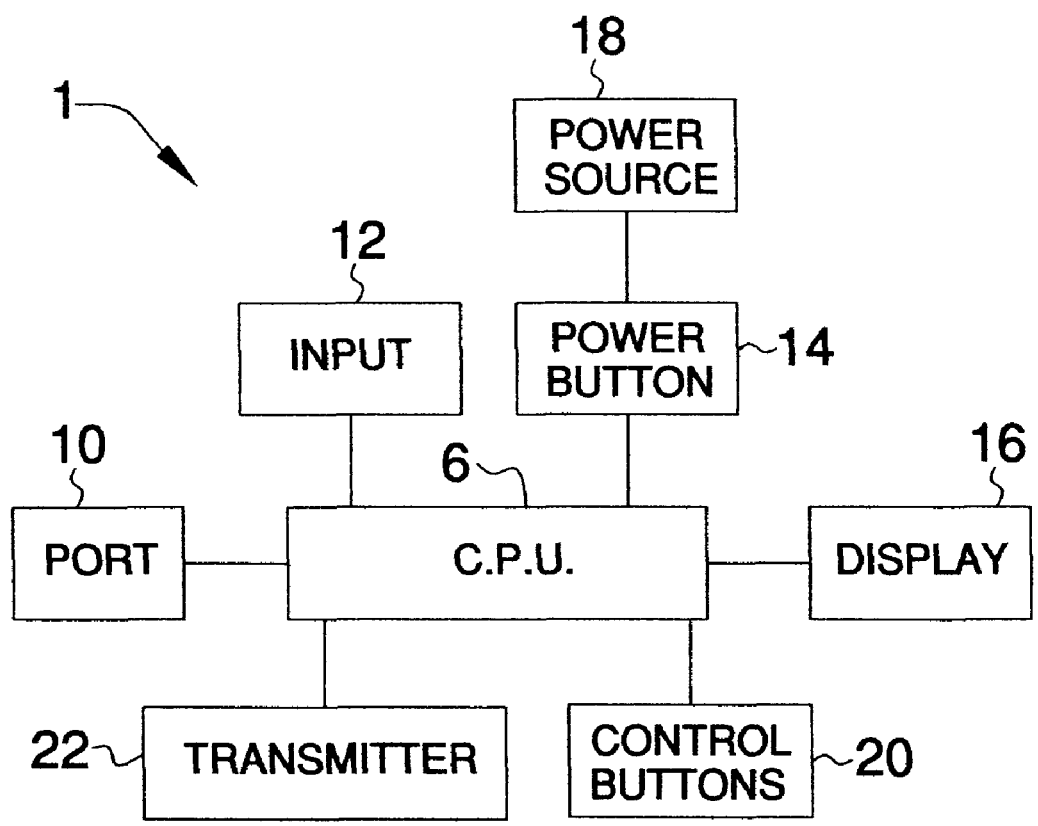
FIG. 5 is a block diagram which illustrates functional components of an illustrative embodiment of the television listing remote control.

Referring to the drawings, an illustrative embodiment of the television listing remote control, hereinafter remote control, is generally indicated by reference numeral 1. The remote control 1 includes a remote control housing 2 which may have a generally elongated, rectangular configuration. A control panel 3 is provided on the remote control housing 2. As shown in FIG. 5, the remote control 1 includes a CPU (central processing unit) 6 which is typically provided in the remote control housing 2 and includes a memory. A port 10, which may be a standard USB port, for example, is provided in the remote control housing 2 and connected to the CPU 6. Accordingly, as shown in FIGS. 2 and 4, in some applications a wireless transmittor 24 is connected to a personal computer 32. A companion USB receiver 24a is inserted in the port 10 of the remote control 1. The USB adaptor 24 transmits a wireless transmission 25, which may be BLUETOOTH® enabled, to the USB receiver 24a. As shown in FIGS. 2 and 3, in other applications the port 10 receives a USE plug 28 provided on a USB cable 26 which is connected to a personal computer 32. This facilitates uploading of television program listing information from the personal computer 32 into the memory of the CPU 6, as will be hereinafter described. As shown in FIGS. 1 and 5, an input button 12 and a power button 14 are connected to the CPU 6. A power source 18, which may be at least one battery, for example, is connected to the power button 14.

A display 16, which may be an LCD screen, for example, is provided on the remote control housing 2 and connected to the CPU 6. Control buttons 20 are provided on the control panel 3 of the remote control housing 2, as shown in FIG. 1. The control buttons 20 typically include television control buttons such as television volume control buttons 20a, a television mute button 20c and television channel control buttons 20d; and an "information" button 20b. Although not shown in FIG. 5, the control buttons 20 may include a scroll button which is connected to the CPU 6 and facilitates scrolling through items listed in a television program listing shown on the display 16. A transmitter 22 is further connected to the CPU 6 for purposes which will be hereinafter described.

The CPU 6 has the capacity to retrieve and store television program listing information for each of multiple television channels from the personal computer 32 through the USB cable 26 (FIG. 3) or via the wireless transmission 25 (FIG. 4). The television program listing information can be downloaded onto the personal computer 32 from one or multiple websites, for example. The information which is to be uploaded to the CPU 6 of the remote control 1 is then selected using selection features (mouse, keyboard, etc.) of the personal computer 32. The input button 12 is adapted to facilitate uploading of the selected information from the personal computer 32 to the memory of the CPU 6 upon depression. The power button facilitates the supply of electrical power from the power source 18 to the CPU 6.

The CPU 6 is adapted to execute various commands responsive to input using the control buttons 20. Responsive to depression of the volume control buttons 20a, the CPU 6 controls the volume of a television set (not shown) via the transmission of signals (not shown) from the transmitter 22. Responsive to depression of the information button 20b, the CPU 6 displays a listing of television programming for various channels on the display 16 which correspond to the channels at a particular time. The listing of television programming may be in any desired format such as a listing of channels on the left and a listing of the names of various television programs which correspond to the respective channels on the right, for example, as shown in FIG. 1. The current time may be additionally displayed on the display 16. The control buttons 20 may include additional features such as scrolling forward in time to indicate the future programming for each channel at selected times throughout the day or night, according to the knowledge of those skilled in the art. Responsive to depression of the mute button 20c, the CPU 6 silences the volume of the television set (not shown) via the transmission of signals (not shown) from the transmitter 22.

Responsive to depression of the channel buttons 20*d*, the CPU 6 scrolls through channels on the television set via the transmission of signals (not shown) from the transmitter 22.

In typical application, television program listing information for a particular cable or satellite television subscription is initially downloaded onto the personal computer from one or multiple websites. The input button 12 is typically depressed to facilitate subsequent uploading of the information from the personal computer 32 into the memory of the CPU 6 through either the USB cable 26 (FIG. 3) or the wireless transmission 25 (FIG. 4). The television program listing information is selectively displayed on the display 16 typically responsive to depression of the information button 20*b*. The volume and channels of a television set (not shown) which is serviced by the cable or satellite television subscription can be selectively controlled by depression of the volume control buttons 20*a*, the mute button 20*c* and the channel buttons 20*d*. By displaying the television program listing information on the display 16, the user can readily identify programs of interest along with the times and channels of the programs. The television program listing information can be periodically downloaded onto the personal computer 32 and then uploaded into the memory of the CPU 6 in the remote control 1 as often as is necessary to keep the television program listing information current.

While the illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A television listing remote control, comprising:
a remote control housing having a control panel;
a central processing unit provided in said remote control housing;
a port provided in said remote control housing and connected to said central processing unit;
a power source provided in said remote control housing and connected to said central processing unit;
an input button provided on said control panel and connected to said central processing unit;
a plurality of control buttons provided on said control panel and connected to said central processing unit, said plurality of control buttons including an information button and a plurality of television control buttons;
a display provided on said control panel and connected to said central processing unit;
wherein said central processing unit is adapted to receive television program listing information through said port responsive to actuation of said input button and display said television program listing information on said display responsive to actuation of said information button; and
a transmitter connected to said central processing unit.

2. The television listing remote control of claim 1 wherein said plurality of television control buttons comprises television volume control buttons and television channel control buttons.

3. The television listing remote control of claim 1 further comprising a power button between said power source and said central processing unit and provided on said control panel.

4. The television listing remote control of claim 1 wherein said port comprises a standard USB port.

5. The television listing remote control of claim 1 wherein said plurality of television control buttons comprises a television mute button.

\* \* \* \* \*